(12) United States Patent
Goettfert et al.

(10) Patent No.: US 7,451,288 B2
(45) Date of Patent: Nov. 11, 2008

(54) WORD-INDIVIDUAL KEY GENERATION

(75) Inventors: Rainer Goettfert, Taufkirchen (DE);
Astrid Elbe, Munich (DE); Berndt Gammel, Markt-Schwaben (DE);
Steffen Sonnekalb, Taufkirchen (DE)

(73) Assignee: Infineon Technologies AG (DE)

( * ) Notice: Subject to any disclaimer, the term of this patent is extended or adjusted under 35 U.S.C. 154(b) by 195 days.

(21) Appl. No.: 11/396,211

(22) Filed: Mar. 30, 2006

(65) Prior Publication Data

US 2006/0265563 A1 Nov. 23, 2006

Related U.S. Application Data

(63) Continuation of application No. PCT/EP2004/009054, filed on Aug. 12, 2004.

(30) Foreign Application Priority Data

Sep. 30, 2003 (DE) ................. 103 45 454

(51) Int. Cl.
*G06F 12/00* (2006.01)
*G06F 12/14* (2006.01)

(52) U.S. Cl. .................. 711/164; 711/216; 711/221

(58) Field of Classification Search .................. 711/164
See application file for complete search history.

(56) References Cited

U.S. PATENT DOCUMENTS

| | | | | |
|---|---|---|---|---|
| 4,319,079 A * | 3/1982 | Best | | 713/190 |
| 5,490,258 A * | 2/1996 | Fenner | | 711/1 |
| 5,915,025 A | 6/1999 | Taguchi et al. | | |
| 6,345,359 B1 | 2/2002 | Bianco | | |
| 7,146,505 B1 * | 12/2006 | Harada et al. | | 713/185 |
| 2002/0122553 A1 * | 9/2002 | Kao et al. | | 380/28 |
| 2002/0143787 A1 * | 10/2002 | Knee et al. | | 707/102 |
| 2003/0059054 A1 * | 3/2003 | Hu et al. | | 380/277 |
| 2003/0105967 A1 | 6/2003 | Nam | | |
| 2004/0028224 A1 * | 2/2004 | Liardet et al. | | 380/37 |
| 2004/0184607 A1 * | 9/2004 | Chang et al. | | 380/45 |

OTHER PUBLICATIONS

Panato et al., "A Low Device Occupation IP to Implement Rijndael Algorithm", Proceedings of the Design, Automation and Test in Europe Conference and Exhibition, IEEE Comput. Soc., US (Mar. 2003).

(Continued)

*Primary Examiner*—Matt Kim
*Assistant Examiner*—Michael C Krofcheck
(74) *Attorney, Agent, or Firm*—Dickstein, Shapiro, LLP.

(57) ABSTRACT

Apparatus and method for generating an individual key for accessing a predetermined addressable unit of a memory divided into addressable units. The apparatus includes a calculator for calculating a page pre-key based on a page address, a determiner for determining the individual key based on the page pre-key and a unit address, a memory for storing the calculated page pre-key, and a checker for checking whether during a next access to a further predetermined unit to which a further unique address is associated, an already calculated page pre-key exists in a temporary memory, which has been calculated based on a page address of a unique address, which is identical to the page address of the further unique address, and, if so, transmitting the already calculated page pre-key to the determiner by bypassing the calculator, and, if not, transmitting the page address of the further unique address to the calculator.

13 Claims, 9 Drawing Sheets

OTHER PUBLICATIONS

Itoh et al., "DPA Countermeasure Based on the "Masking Method"", Information Security and Cryptology—ICISC 2001. 4th International Conference Proceedings (Lecture Notes in Computer Science, vol. 2288, pp. 440-456, Springer-Verland Berlin, Germany (Dec. 2001).

Labbe et al., "DES-SRAM IP-Core: a SRAM embedding DES Feature", SOC Conference, 2003. Proceedings. IEEE International Systems-On-Chip, pp. 17-20, Piscataway, N.J., U.S.A. (Sep. 2003).

The CRC Press Series on Discrete Mathematics and its Applications. Series Editor: Kenneth H. Rosen, Ph.D., AT&T Laboratories, pp. 228-231 (1997).

Bruce Schneier, XP-002309006, pp. 220-222 "Applied Cryptography" (1995).

Menezes et al., "Handbook of Applied Cryptography", CRC Press, pp. 223-282 (1996).

* cited by examiner

US 7,451,288 B2

WORD-INDIVIDUAL KEY GENERATION

CROSS-REFERENCE TO RELATED APPLICATION

This application is a continuation of copending International Application No. PCT/EP2004/009054, filed Aug. 12, 2004, which designated the United States and was not published in English.

BACKGROUND OF THE INVENTION

1. Field of the Invention

The present invention relates to the protection of memory contents by encryption in general and particularly to the generation of unit-individual keys for accessing the address by units of a memory.

2. Description of the Related Art

For a protection against unauthorized spying out of stored information, the memory contents of the memory are encrypted in different applications. In the field of cashless payments, for example, amounts of money stored on chip cards are stored in an encrypted way to protect them from unauthorized spying out, or from manipulations, such as unauthorized alterations of the amount.

An unauthorized person obtains the encrypted information stored in the memory, i.e. the plain text, for example, by statistical analysis of the cipher text stored on the memory. This statistical analysis comprises, for example, an analysis of the occurrence probability of certain cipher text data blocks or the same. In order to impede these statistical analyses, it is desirable that equal plain texts, which are in encrypted form at different memory positions of the memory, do not exist there in the form of identical cipher texts.

One possibility to ensure the encryption of plain texts at different memory positions in the different cipher texts, is to use the so-called cipher block chaining method for encryption, i.e. operating a block cipher in the CBC mode, as it is, for example, described in the handbook of Applied Cryptography, CRC Press, NY, 1997, p. 230. In the CBC mode, for encrypting a plain text data block, always the cipher text of the previous plain text data block is used, such as of the plain text data block with an address lower by 1 or higher by 1 in the memory. The CBC mode has the disadvantage that an individual isolated datum in the memory can only be encrypted when the whole chain of sequential data is decrypted. Thus, no direct access to data is possible within the CBC chain. Going through the cipher chain takes up valuable computing time and consumes an unnecessary amount of current, which is particularly a disadvantage in smartcards used in battery-operated devices, such as mobile phones, or in chip cards, where the customers of the chip card providers require transaction times at the terminals, which are as short as possible.

A further possibility to ensure that equal plain texts, which are at different memory positions, are encrypted into different cipher texts, is to generate address-dependent keys for encrypting the plain text. The usage of address-dependent keys uses the fact that a fixed memory space and thus a dedicated address is associated to a datum to be stored and to be encrypted, and that the encrypted stored datum is stored at exactly this dedicated address, and remains there, until it is readout again on the basis of this address. An individual key can be generated from an existing secret master key and the address information for a memory position or an individually addressable unit, respectively, with which then the respective datum can be encrypted in a write and decrypted in a read. The address-dependent generation has the disadvantage that the effort for the key generation is about as high as the effort for the encryption or decryption, respectively, itself, since a key generation has to be performed for every addressable memory space or every addressable memory word, respectively, which ensures that the mapping of the address to associated address-dependent keys is as obscure as possible for an unauthorized person. Thus, key generation on memory word granularity causes a high degree of performance reduction, which can for example, reduce the customer convenience with chip cards.

One possibility to compensate for the lack of security by omitting the address dependency during encryption of stored memory contents would be to increase the block sizes during encryption, since this increases the number of possible plain texts for a cipher text. However, this involves an increased effort on the part of the encryption and decryption hardware, which makes this option unbearable for a mass commodity like chip cards.

SUMMARY OF THE INVENTION

The present invention provides a method and an apparatus for generating individual keys allowing access to a memory based on these individual keys and to thereby reduce the overall effort for the access.

In accordance with a first aspect, the present invention provides an apparatus for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page, having: a means for calculating a page pre-key based on the page address; a means for determining the individual key based on the page pre-key and the unit address; and a means for storing the calculated page pre-key; and a means for checking whether during a next access to a further predetermined unit to which a further unique address is associated, an already calculated page pre-key exists in a temporary memory, which has been calculated based on a page address of a unique address, which is identical to the page address of the further unique address, and, if this is the case, transmitting the already calculated page pre-key to the means for determining by bypassing the means for calculating, and, if this is not the case, transmitting the page address of the further unique address to the means for calculating.

In accordance with a second aspect, the present invention provides a system for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page. The system has the above-mentioned apparatus, and an apparatus for decrypting an encrypted memory content in the predetermined addressable unit based on the individual key.

In accordance with a third aspect, the present invention provides a system for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page. The system has the above-mentioned apparatus, and an apparatus for encrypting data to be stored based on the individual key and writing the encrypted data to be written into the predetermined addressable unit.

In accordance with a fourth aspect, the present invention provides a method for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page. The method includes the steps of: calculating a page pre-key based on the page address in a means for calculating; determining the individual key based on the page pre-key and the unit address in a means for determining; temporarily storing the calculated page pre-key in a means for temporary storage; and checking whether during a next access to a further predetermined unit, to which a further unique address is associated, an already calculated page pre-key exists in a temporary memory, which has been calculated based on a page address of a unique address, which is identical to the page address of the further unique address; if an already calculated page pre-key exists, transmitting the already calculated page pre-key to the means for determining by bypassing the means for calculating; and if no already calculated page pre-key exists, transmitting the page address of the further unique address to the means for calculating.

In accordance with a fifth aspect, the present invention provides an apparatus for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable units belongs, and a unit address identifying the addressable unit among the other addressable units belonging to the page. The apparatus includes: a calculator for calculating a page pre-key based on the page address; and a determiner for determining the individual key based on the page pre-key and the unit address. The determiner has a deriver for deriving several round keys from the page pre-key, and a definer for defining an order among the round keys to obtain a sequence of the round keys, wherein the sequence depends on the unique address and the order represents the individual key.

In accordance with a sixth aspect, the present invention provides a method for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable units belongs, and a unit address identifying the addressable unit among the other addressable units belonging to the page. The method includes the steps of: calculating a page pre-key based on the page address in a means for calculating; and determining the individual key based on the page pre-key and the unit address in a means for determining. The step of determining the individual key has the following substeps: deriving several round keys from the page pre-key; and defining an order among the round keys to obtain a sequence of the round keys, wherein the sequence depends on the unique address and the order represents the individual key.

In accordance with a seventh aspect, the present invention provides a computer program with a program code for performing one of the above-mentioned methods when the computer program runs on a computer.

It is the knowledge of the present invention that the grouping of individually addressable units of a memory into groups or pages, respectively, which is already present in many systems, can be used to significantly decrease the complexity of the address-dependent key generation with only a slight reduction in security, if at first a page pre-key is calculated based on a page address and then the individual key is determined based on the page pre-key and the word address. Thereby, the address-dependent key generation can be divided into a cryptographically demanding and relatively expensive process, which, however, only has to be performed rarely, namely the page pre-key calculation, and into a fast, almost effortless step that has to be generated for every word or every individually addressable unit, respectively, namely the determination of the individual key based on the page pre-key and the word address. Thus, the page pre-key calculation process can be chosen such that the process has less chip area and/or more processing run time during implementation than the implementation of the determination of the individual key. Thereby, the access time to the memory can be reduced, since the page address is the same for all individually addressable units belonging to one page, and thus does have not to be calculated again each time. Rather, the page address can be latched in order to be available for those of the subsequent accesses to the memory, which relate to the addressable units in the respective memory page. Storing can, for example, be performed in a displacement memory, where a certain displacement mechanism is used to temporarily store in the same, for example, the page pre-keys for those pages or their included units to which access will be made again shortly with high probability. If this memory is present, the same can be integrated or combined, respectively, with a cache or data cache memory, respectively, which exists in a similar way to provide current data for a fast access, without requiring access to a slower background memory.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Before the present invention will be discussed below in more detail with reference to the based on embodiments, it should be noted that equal elements or similar elements in these figures are designated with equal or similar reference numbers, and that a repeated description of these elements is omitted.

Figure 1:
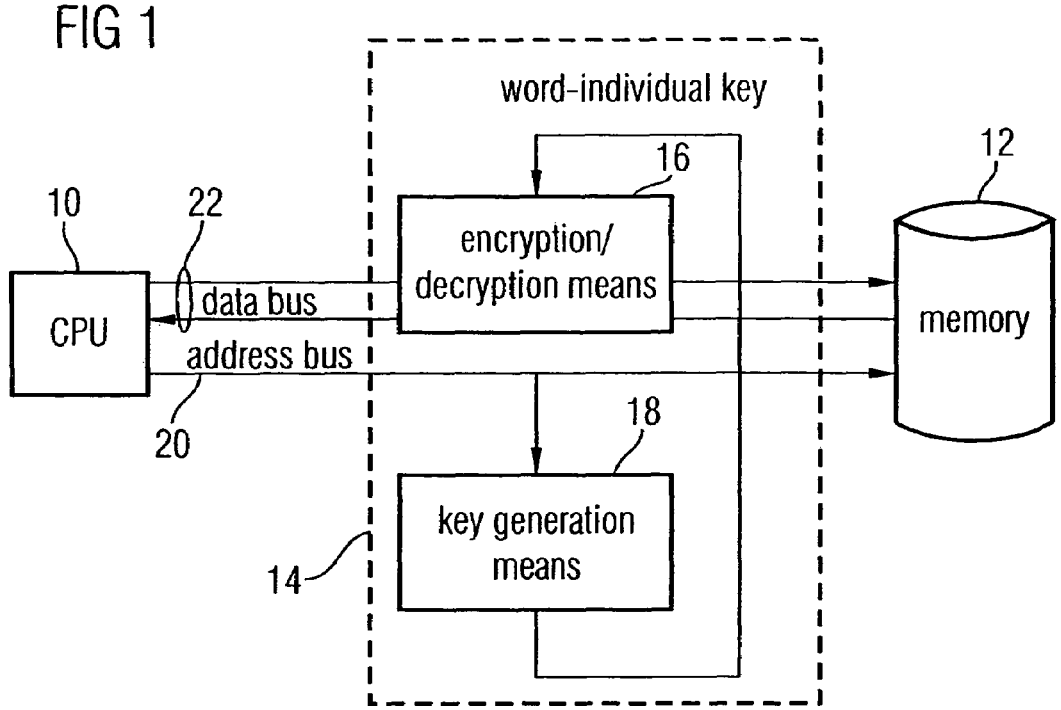
FIG. 1 is a block diagram of a memory system, wherein an inventive key generation can be used, according to an embodiment of the present invention.

FIG. 1 shows a system of CPU 10, memory 12 and memory access apparatus 14. The system of FIG. 1 is, for example, part of cryptocontroller on a chip card. Secret information such as a credit balance, a master key or general key of a chip card providing institute or a secrete code of a secrete cryptography algorithm, is stored in the memory 12, which can, for example, be part of a physically larger memory.

The CPU 10 executes a program which can, for example, also be stored in the memory 12, in order to be protected from access by unauthorized persons. Some instructions in the program require that the CPU 10 loads memory contents into the memory 12 or reads them out, or writes or overwrites memory contents in the memory 12 by new information.

The access apparatus 14 is provided to ensure that the secret information in the memory 12 is always stored in encrypted form, and that, on the other hand, the encrypted memory contents of the memory 12 are decrypted again during load processes or during reading out the same, respectively.

The access apparatus 14 comprises an encryption/decryption means 16 as well as a key generation means 18. The encryption/decryption means 16 is provided to encrypt data from the CPU to be stored in the memory 12 prior to their storage, and to decrypt stored and encrypted data output by the memory 12 prior to their transmission to the CPU 10. For this purpose, the decryption/encryption means 16 uses a word-individual key, which it obtains from the key means 18.

Specifically, the CPU 10 is connected to both an address input of the memory 12 and an address input of the key generation means 18 via an address bus 20. The key generation means 18 outputs word-individual keys for the addresses on the address bus 20 at its output, wherein the output of the key generation means 18 is connected to a key input of the encryption/decryption means 16. The CPU 10 is connected to a data input/output of the memory 12 via a data bus 22. The decryption/encryption means 16 is connected into the data bus 22. Particularly, a data input of the encryption/decryption means 16 is connected to a data output of the CPU 10, and a further data input of the encryption/decryption means 16 is connected to a data output of the memory 12, while a data output of the encryption/decryption means 16 is connected to a data input of the memory 12 and a further data output of the encryption/decryption means 16 to a data input of the CPU 10. Thus, the encryption/decryption means 16 forms an interface between CPU 10 and memory 12 and ensures that the data exist on that part of the data bus 22 between CPU 10 and encryption/decryption means 16 only in decrypted form, i.e. in plain text, and in that part of the data bus 22 between the memory 12 and the encryption/decryption means 16 only in encrypted form, i.e. as cipher text.

Since the structure of the system of FIG. 1 has been described above, its mode of operation will be described below. In the subsequent description of the mode of operation of the CPU 10, it is assumed that encrypted memory contents are already in the memory 12. The memory 12 is divided into smallest individually addressable units, in the following referred to as words. A unique address is associated to every word of the memory 12. If the CPU 10 is required to perform a load process during execution of a program, i.e. to load the encrypted memory content at an individually addressable element or a word, respectively, from the memory 12, the CPU 10 outputs the corresponding unique address on the address bus 20. The memory 12 uses the address to access the corresponding physical memory position and to read out the encrypted word stored there, and to output the same on the data bus 22 to the encryption/decryption means 16.

The key generation means 18 also receives the address output by the CPU 10. As will be described below, the key generation means 18 determines a word-individual key from the address on the address bus 20, which is required by the encryption/decryption means 16 to decrypt the encrypted readout memory contents from the memory 12. Therefore, the key generation means 18 outputs the word-individual key to the encryption/decryption means 16. The same decrypts the memory content received from the memory 12 based on the word-individual key and outputs this memory content in plain text to the CPU 10, which processes the now decrypted memory content in plain text, depending on the instruction, such as loading the same into an internal register or the same.

In the case when the program to be executed indicates a write in the instruction line to be executed, the CPU 10 outputs the address on the address bus 20, which indicates the word wherein a date specified by the write instruction is to be stored. The datum to be stored is output by the CPU 10 on the data bus 22 to the encryption/decryption means 16. As before in the load process, the key generation means 18 generates a word-individual key from the address on the address bus 20 and outputs the same to the encryption/decryption means 16. The same uses the word-individual key for encryption of the datum to be stored and outputs the cipher text to the memory 12. The memory 12 stores the received cipher text at the location indicated by the address on the address bus 20 in the respective word.

In the above description, the mode of operation of the key generation means 18 has not been discussed in detail. As the embodiments for the key generation means 18 described below will show, the key generation means 18 is formed such that it is able to generate word-individual keys for encrypting memory contents or words, respectively, in the memory 12, but without performing a key generation process each time, which requires about the same effort. This is obtained by combining several words, which represent the smallest addressable data units of the memory 12, to one page, and that for one page only the page address, which specifies the page among the pages of the memory 12, is used in a complicated and expensive and thus secure way for generating a page pre-key, while for the words within the page, the word-individual keys are generated in a simple and less complicated way based on the page pre-key. If then, as frequently happens, the CPU 10 sequentially loads the words of a page, then it is only required to perform the expensive pre-key generation at the first word of this page, while for the other words of the page only the less expensive derivation of the word-individual keys based on this pre-key is required.

Figure 2:
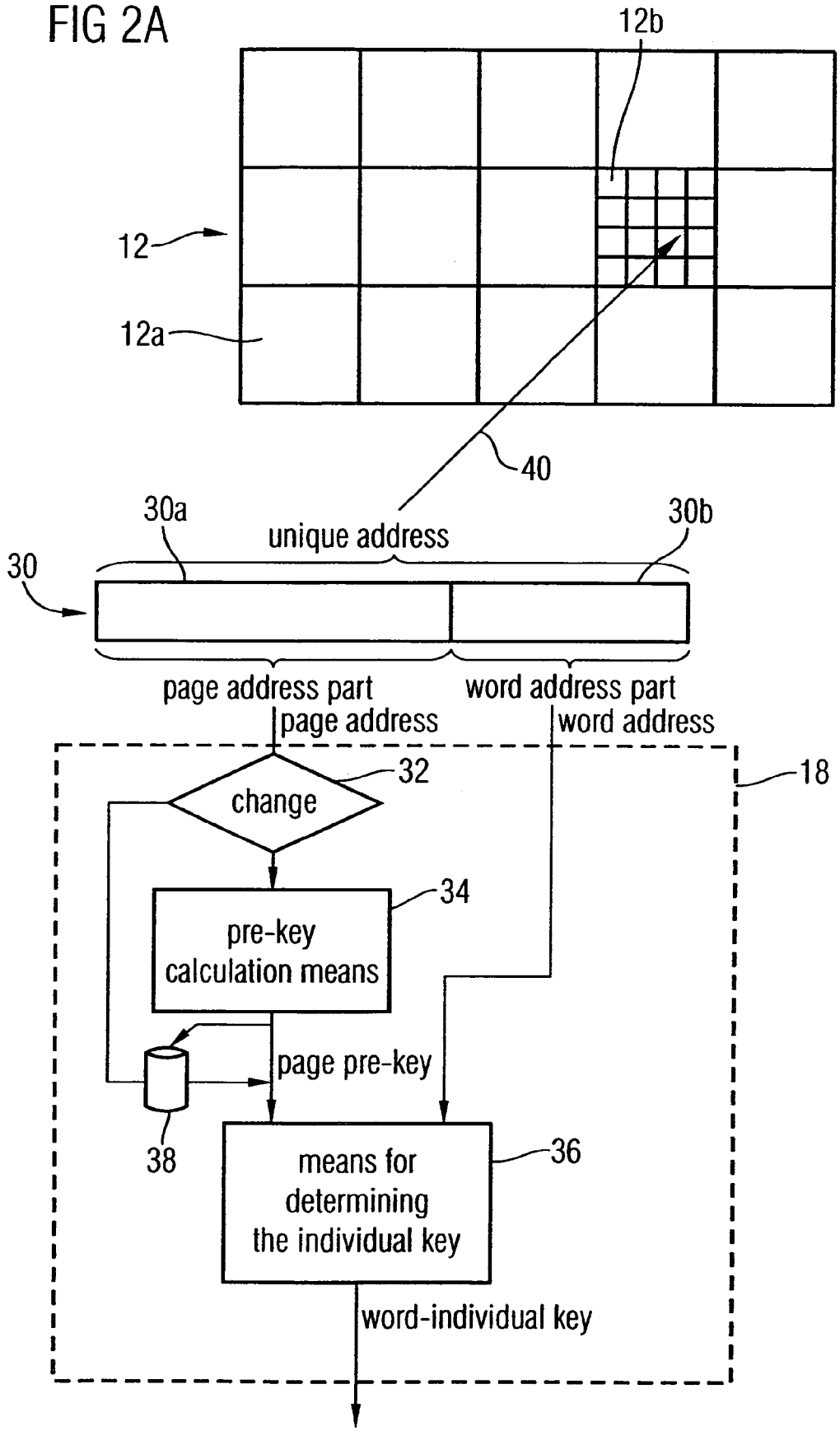
FIG. 2a is a schematical block diagram for illustrating the structure and the mode of operation of the key generation means in the memory system of FIG. 1 according to an embodiment of the present invention.
FIG. 2b is a schematical representation of the structure of a page of words according to an embodiment of the present invention.

In order to illustrate the division of the memory 12 in pages and words in more detail, first, reference will be made to FIGS. 2a and 2b. In the upper half, FIG. 2a shows a portion of the memory 12 schematically illustrated as rectangle. The portion illustrated in FIG. 2a comprises exemplarily 15 pages 12a. Again, every page comprises 16 words 12b, wherein this is illustrated in FIG. 2a only for one page 12a for clarity reasons. The words 12b of the memory 12 are the smallest addressable data units of the memory 12. In other words, a unique address is associated to every word 12b, by which it is possible to access the memory contents of the individual words 12b by the units connected to the memory 12, such as the CPU 10 of FIG. 10. Thus, it should be noted that the spatial arrangement of words 12b, as illustrated in FIG. 2a, is of course only exemplarily, and that the memory 12 can also have several overlaying memory levels, and that the individual words 12b can also be combined into pages in another way, or can be disposed in another way than in rows and columns, as is shown in FIG. 2a.

In order to simplify the representation of the following description, it will be assumed below that the memory 12 comprises $2^{20}$ words. Every word consists of $32=2^5$ bits. Thus, according to this merely illustrative example, the memory size of the memory 12 is $2^{25}$ bit$=2^{17} \times 2^8$ bit$=128$ kilobyte. The division into pages is exemplarily performed such that all words with addresses whose 16 most significant bits (MSB) are equal, belong to one page or are combined into one page, respectively. Thus, the word addresses of words in one page differ merely in the remaining four least significant bits (LSB) of the twenty bit word address. Thus, the memory 12 contains $2^{16}$ pages.

In FIG. 2a, the structure of a unique address of a word 12b is shown exemplarily at 30. As has already been discussed, in the following, it is assumed that the unique address 30 is 20 bits long. The high-order part of the unique address consisting of the 16 MSBs is referred to as page address part 30a of the unique address. The page address part 30a contains the so called page address. The low-order part 30b of the unique address is formed from the four LSBs and represents the word address part 30b. The word address part 30b indicates to which of the words in the page 12a indicated by the page address part the unique address 30 is associated.

This will be illustrated in FIG. 2b in more detail, which illustrates for one page 12b the division into 16 words 12b of this page 12a, and wherein the words are numbered and provided with associated 4-bit word address or a 4-bit offset value, respectively, which has to be included in the word address part 30b for the respective word. Thus, a fixed position within every page is assigned to every word by the word address or the offset value, respectively, in the word address part 30b.

With reference to FIG. 2a, below, the key generation means 18 will be described in more detail according to an embodiment of the present invention. The key generation means 18 comprises a page change detection means 22, a pre-key calculation means 34 and a means 36 for determining the individual key. Further, the key generation means 18 comprises a memory, such as a volatile memory, 38 for temporally storing the last used page pre-key(s) whose function and generation will be discussed in more detail below.

The page change detection means 32 is provided to receive the page address part 30a of the unique address 30 on the address bus 20 and then check whether this concerns a page for which a page pre-key is already in the latch 38. If this is the case, the page change detection means 32 can access the latch 38 based on the page address stored therein, which then transmits the latched page pre-key for the page indicated by the page address to a page pre-key input of means 36.

If the page change detection means 32 determines that no page pre-key is present for the page indicated by the page address, the same transmits the page address to a page address input of the pre-key calculation means 34. The pre-key calculation means 34 calculates a page pre-key for this page from the page address and transmits the calculated page pre-key to the page pre-key input of the means 36. Further, it outputs the same by displacing an already stored page pre-key to the memory 38 for temporary storage.

The word address part 30b of the unique address 30 present on the address bus 20 is transmitted to a word address input of the means 36 for determining the individual key. The means 36 determines a word-individual key for the word to which the unique address 30 points, from the received word address or received offset value, respectively, and received page pre-key. The means 36 outputs this word-individual key at its output, which at the same time represents the output of the key generation means 18, which is connected to the key input of the encryption/decryption means 16, as shown in FIG. 1.

Since the structure as well as the mode of operation of the individual components of the key generation means 18 has been described above, in the following, the mode of operation will be described. For that purpose, it is at first assumed that no page pre-key has been generated for any page 12a of memory 12, which means that none is stored in the memory 38.

When a unique address 30 is received, the page change detection means 32 first looks up in the memory 38 whether a page pre-key is present for the page address of the page included in the page address part 30a wherein the word is, to which the unique address 30 points, as indicated by an arrow 40. Looking up takes place by using the page address as index, wherein a table of page address/page pre-key pairs is provided in the memory 38. Thus, the memory 38 is a content addressable memory, which looks up for incoming page addresses whether it has a page address/page pre-key pair with this page address and outputs the respective key, if this is the case. According to the above assumption, this will not be the case. The memory 38 thus indicates the miss to the page change detection means 32, which again transmits the page address to the pre-key calculation means 34.

The pre-key calculation means 34 calculates a page pre-key based on the page address. According to the embodiment described in more detail with reference to FIG. 3, this calculation comprises, for example, an encryption of the page address by using a master key, so that the correlation between page pre-keys, which the pre-key calculation means 34 calculates from the page addresses, to the page addresses is as complicated as possible. The pre-key calculation means 34 can, for example, map the page address generally at its page address input on the page pre-key according to a nonlinear mapping. This nonlinear mapping can either be any mapping of the 16-bit page address to a M bit page pre-key, wherein m has to be $\geq 16$, so that a different page pre-key is generated for every page, but m can also be smaller than 16, if this is not required. The pre-key calculation means 34 can also use a one-way function or an asymmetric encryption to map the page address onto the page pre-key.

The word address part 30b of the unique address 30 present on the data bus containing the offset value and the page pre-key just calculated from the pre-key generation means 34 is used by the means 36 to calculate the word-individual key. As will be discussed below with reference to FIGS. 4-7, the means for determining the individual key 36 can, for example, use the offset value or the word address, respectively, at its word address input for modifying the page pre-key by using simple calculating operations, such as XOR or NXOR operations or the same. Preferably, the calculation operation used by the means 36 for determining the individual keys should have a smaller number and be less time consuming than the pre-key calculation means 34 uses for calculating the page pre-key. Further, it is preferred that the means 36 for determining an individual key is implemented with less chip area and/or the implementation of the means 36 for determine an individual key has a lower calculation time period than the pre-key calculation means 34.

The word-individual key as determined by means 36 is then transmitted to the encryption/decryption means 16.

In order to avoid that the complicated pre-key calculation has to be performed again for every unique address output on the address bus 20, the pre-key calculation means 34 stores the just calculated page pre-key in the latch 38 during every calculation. The latch 38 is, for example, managed according to the FIFO principle (FIFO=first in, first out), so that during storing a new page pre-key by the pre-key calculation means 34, the page pre-key that has been written in first is displaced or overwritten, respectively. Of course, other update or displacement principles can be used, such as the LRU (least recently used) principle, where that page pre-key, which the page change detection means 32 has not accessed for the longest time, is displaced, or the LFU (least frequently used) principle, where that page pre-key is displaced which has the lowest number of accesses from the page change detection means 32.

If a subsequent unique address 30, which will be output on the address bus 20, has a page address part 30a including a page address indicating a page for which a page pre-key is latched in the latch 38, the latch 38 indicates this by a hit signal to the page change detection means 32 in response to receiving the page address as index. Then, the page change detection means 32 does not transmit the page address to the page address input of the encryption calculation means 34, but by bypassing the latter, the page pre-key associated to the page address of interest and already calculated before, is output from the memory 38 to the page pre-key input of means 36. Due to bypassing the pre-key calculation means 34 in the case of a hit, in that case, no complicated and time consuming pre-key calculation has to be performed. Merely a look-up process in the latch 38 is required to determine the page pre-key for the new unique address 30 on the address bus 20. Here, in the meantime, one or several unique addresses 30 can have been output on the address bus 20 between the unique address 30, upon the output of which on the address bus 20 the page pre-key has actually been calculated by the pre-key calculation means 34 and inserted into the latch 38, and the unique address 30, upon which the page pre-key is retrieved from the latch 38. This means that no pre-key calculation has to be performed with an appropriate displacement strategy of the latch 38 adapted to the respective application of the system of FIG. 1, possibly across longer time periods or across several unique addresses 30 on the address bus 20, respectively. Merely the uncomplicated modification of a page pre-key retrieved from the latch 38 by the word address or the offset value, respectively, in the means 36 has to be performed to obtain the word-individual key for the word to which the unique address 30 on the address bus 20 is associated.

The latch 38 can be integrated in a cache memory (not shown in FIG. 1) associated to a CPU 10 to form an extended cache. The cache contained then, for example, the content of recently used pages, i.e. pages which have been recently accessed, for a faster data access. The content would be stored in an encrypted way. The associated page address and the page pre-key were stored in the cache for every page content. This extended cache contained a table of triplets of page address, page pre-key and page cipher text. The displacement strategy of this extended cache could be one of the above mentioned ones. In the case of a miss, the mode of operation would be the same, as described above, with the difference that now the encrypted content of the current page is stored in the cache by displacing another page. In the case of a hit, apart from outputting the page pre-key to the means 36, further, the encrypted word to which the unique address 30 points from the cipher text of the page of interest, would be output to the data input of the encryption/decryption means 16 (FIG. 1), which is connected to the memory 12, which bypasses the slower access to the memory 12. Of course, the cache memory could also be organized word by word, with triplets of word address, word cipher text and page pre-key. In the case of a data cache with unencrypted data, the same would be arranged in the plain text domain between CPU and apparatus 14 (FIG. 1) and a combination of the data cache with the memory 38 would be unnecessary. Further, instead of the cache memory 38, a simple memory could be used for storing the last calculated page pre-key, whose content is read out in a subsequent access process and used by bypassing the means 34, when the next page address to which this access process is related, is the same as the one to which the previous storage process related, where the last calculated memory pre-key has been calculated and stored.

Figure 3:
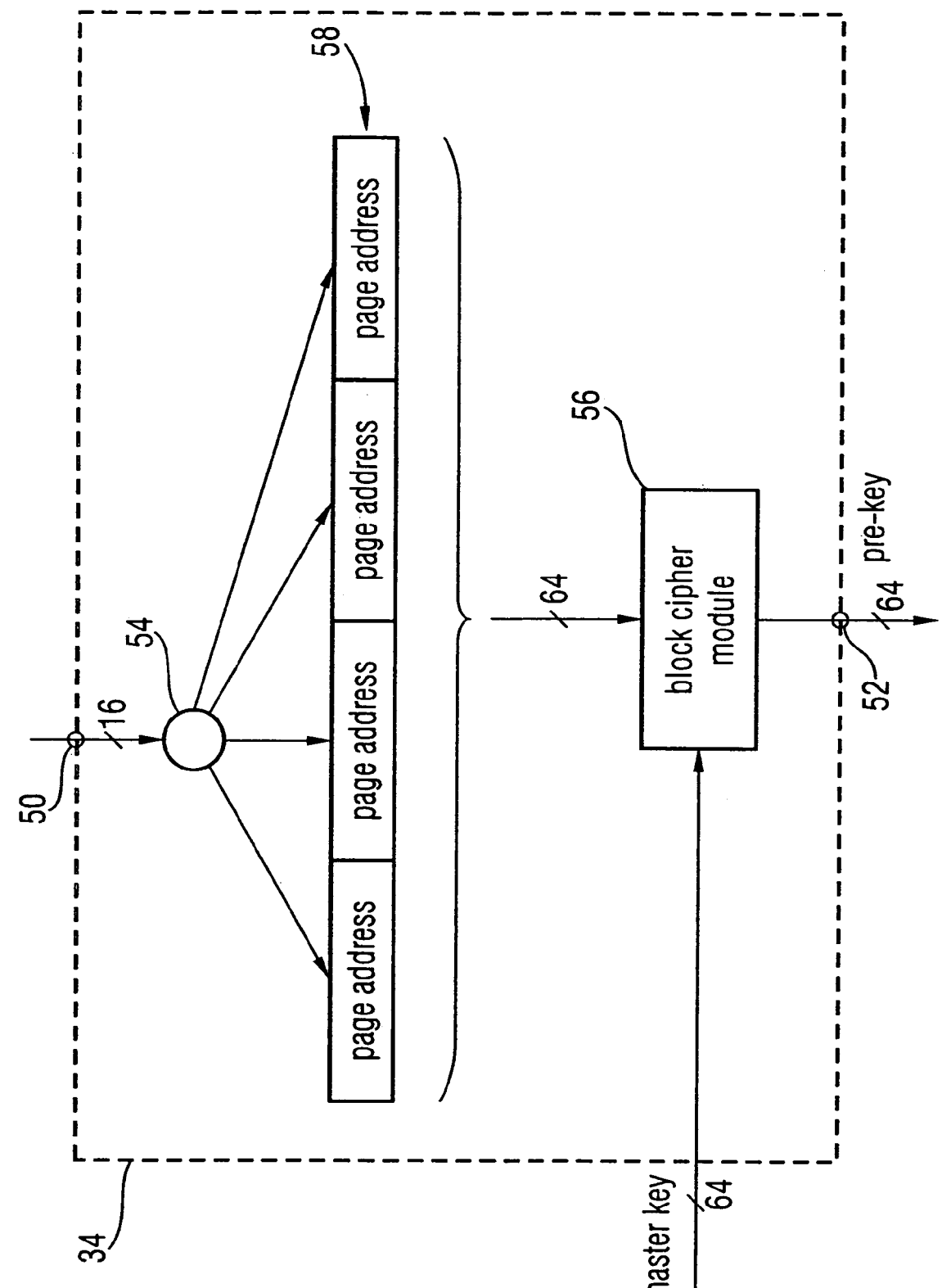
FIG. 3 is a schematical block diagram for illustrating the structure and the mode of operation of the pre-key calculation means in FIG. 2 according to an embodiment of the present invention.

With reference to FIG. 3, an embodiment for the pre-key calculation means 34 will be described below. The pre-key calculation means 34 of FIG. 3 comprises a page address input 50 and a pre-key output 52, as well as an expansion means 54 and a block cipher module 56. A data input of the expansion means 54 is connected to the page address input 50 to obtain the 16-bit page address. Based on the 16-bit page address, the expansion means 54 generates a 64-bit data block 58 by distributing every bit of the page address to four bit positions of the 64-bit data block 58. More particularly, the expansion means 54 writes the page address into bits 0-15, 16-31, 32-47 and 48-63 of the 64-bit data block 58, as indicated in FIG. 3. The expansion means 54 outputs the 64-bit data block 58 formed that way to a data input of the block cipher module 56. Apart from the data input, the block cipher module 56 comprises a key input where the same obtains a 64-bit master key. The 64-bit master key is fixed and has to be protected from unauthorized access by third parties by appropriate measures. The block cipher module 56 effects a non-linear mapping depending on the master key and is, for example, a DES module or an AES module. Based on the master key, the block cipher module 56 ciphers or encrypts, respectively, the 64-bit data block 58 to obtain an encrypted 64-bit data block and to output the same to the data output 52. This encrypted 64-bit data block represents the page pre-key according to this embodiment, based on which the word-individual keys of the words of the associated page are calculated, to which the page address points at the input 50, as described in FIG. 2a.

With reference to the following FIGS. 4-7, embodiments for the means 36 for determining the individual key from the page pre-key and the word address of FIG. 2a will be described.

Figure 4:
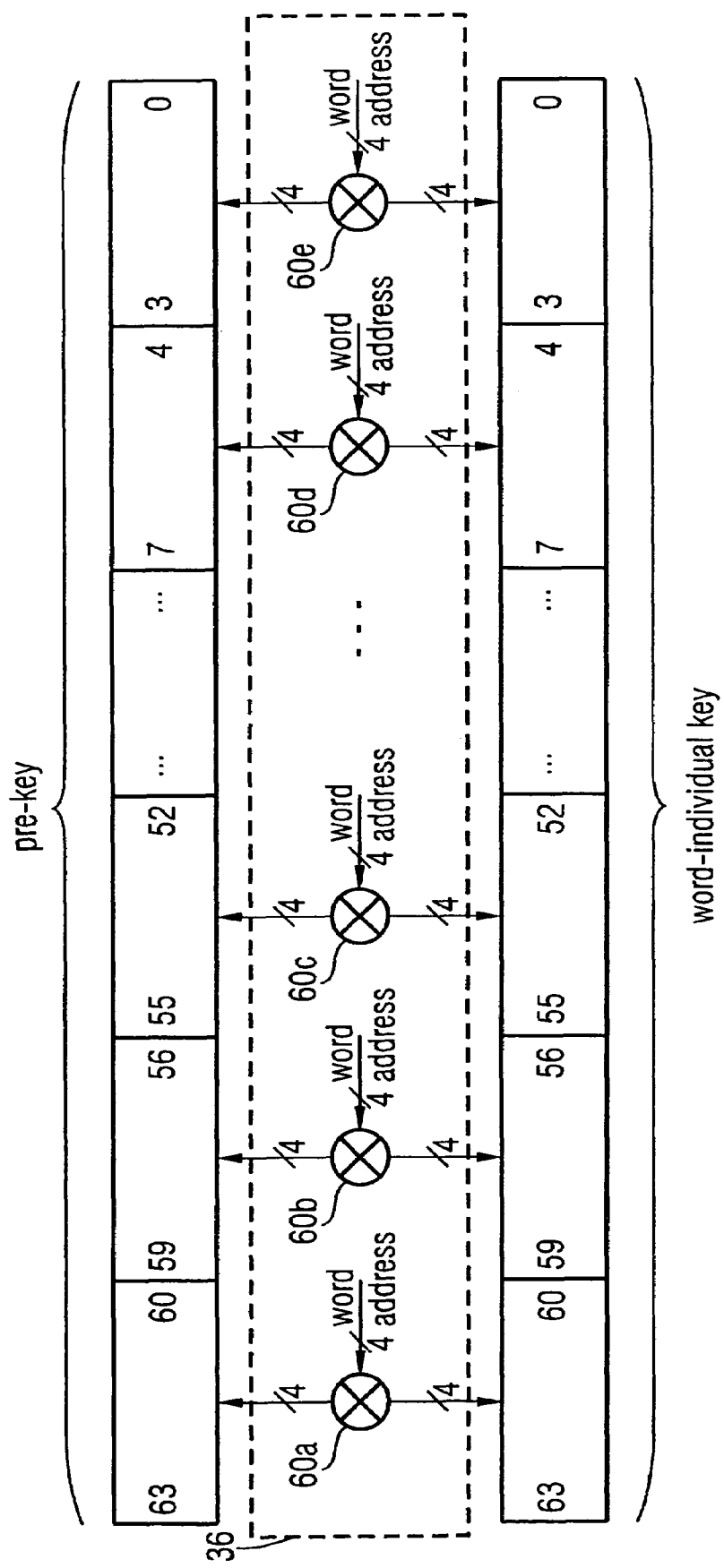
FIG. 4 is a schematical drawing for illustrating the structure and the mode of operation of the means for determining the individual key from the page pre-keys and the word address of FIG. 2 according to an embodiment of the present invention.

According to the embodiment of FIG. 4, the 4-bit word address is added up to the page key several times by XOR operations. Therefore, the means 36 comprises 16 4-bit XOR operation means 60a, 60b, 60c, 60d and 60e. Every XOR operation means comprises two 4-bit data inputs and one 4-bit data output. The XOR operation means 60a-60e receive the 4-bit word address at the first of the two 4-bit data inputs. At the second data inputs, the XOR operation means 60a-60e receive different four bits of the 64-bit pre-key, which has been generated, for example, in the way shown in FIG. 3. More particularly, every XOR operation means 60a-60e receives different ones of four subsequent bits of the page pre-key, namely the XOR operation means 60a the bits of the bit positions 63-60, the XOR operation means 60, the bits of the bit positions 59-56, the XOR operation means 60c the bits of the bit positions 55 . . . 52, etc. of the pre-key, as indicated in FIG. 4. The XOR operation means 60a-60e link the 4-bit word address bit by bit with the respective four bits from the 64-bit pre-key.

The page key is, for example, given as vector $\overline{K}_{page}=(k_0 k_1 k_2 \ldots k_{62} k_{63})$, wherein $k_i$, for i=0 . . . 63, is the bit value of the page pre-key at the bit position i, and the word address is given by the vector $(w_0\, w_1\, w_2\, w_3)$, wherein $w_j$ with j=0 . . . 3 is the bit of the word address at the bit position j. The bitwise XOR operation results of the XOR gate 60a-60i are then combined into a word-individual key with 64 bits such that the word-individual key to a vector $\overline{K}_{Word}$ results, with $\overline{K}_{Word}=(k_0 \oplus w_0,\, k_1 \oplus w_1,\, k_2 \oplus w_2,\, k_3 \oplus w_3,\, k_4 \oplus w_0,\, k_5 \oplus w_1,\, k_6 \oplus w_2,\, k_7 \oplus w_3,\, \ldots,\, k_{60} \oplus w_0,\, k_{61} \oplus w_1,\, k_{62} \oplus w_2,\, k_{63} \oplus w_3)$, wherein $\oplus$ indicates an XOR operation.

Figure 5:
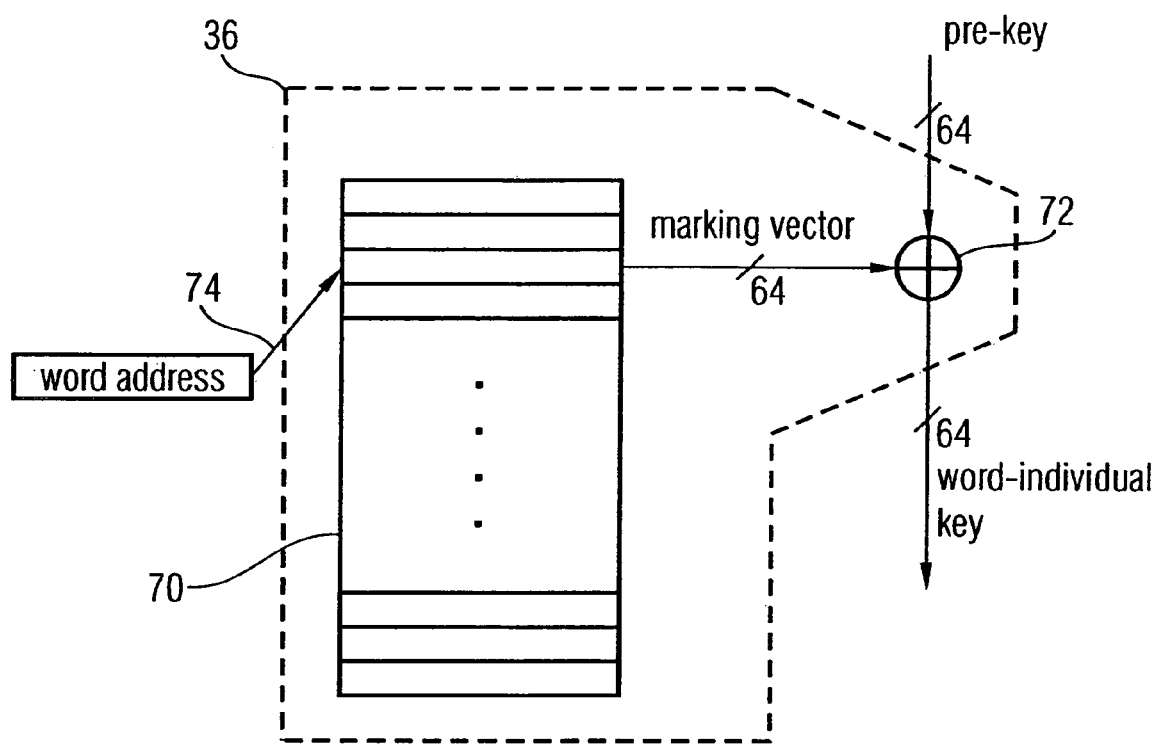
FIG. 5 is a schematical drawing for illustrating the structure and the mode of operation of the determination means of FIG. 2 according to a further embodiment of the present invention.

According to the embodiment of FIG. 5, the means 36 for determining the individual key comprises a look-up table 70, which provides a different 64-bit masking vector as well as 64-bit XOR operation means 72 for every possible 4-bit word address. According to this embodiment, the look-up table 70 is accessed, for example with the word address as index to a look-up means indicated by 74, to access the masking vector associated to the word address, which is supplied to the means 36 from the word address part of the unique address currently present on the address bus. The look-up table outputs the indexed masking vector to a first data input of the XOR operation means 72. A second 64-bit data input of the XOR operation means 72 receives the 64-bit page pre-key. A 64-bit data output of the XOR operation means 72 represents at the same time the output of means 36 of FIG. 5. The word-individual 64-bit key is output at the same.

If the page pre-key is, for example, given by the vector $\overline{K}_{page}$ defined with regard to FIG. 4, the XOR operation means 72 outputs $(k_0 \oplus m_0,\, k_1 \oplus m_1,\, \ldots,\, k_{63} \oplus m_{63})$ as word-individual key $\overline{K}_{word}$ at its data output when the indexed masking vector is $(m_0, m_1, \ldots, m_{63})$. In other words, according to the embodiment of FIG. 5, a masking vector is provided for every word address, which has the same bit length as the page pre-key, wherein the masking vector associated to the same is controlled via a look-up table for the word address of interest, and this masking vector is then added up to the page pre-key by an XOR operation, wherein the result is the word-individual 64-bit key.

Figure 6:
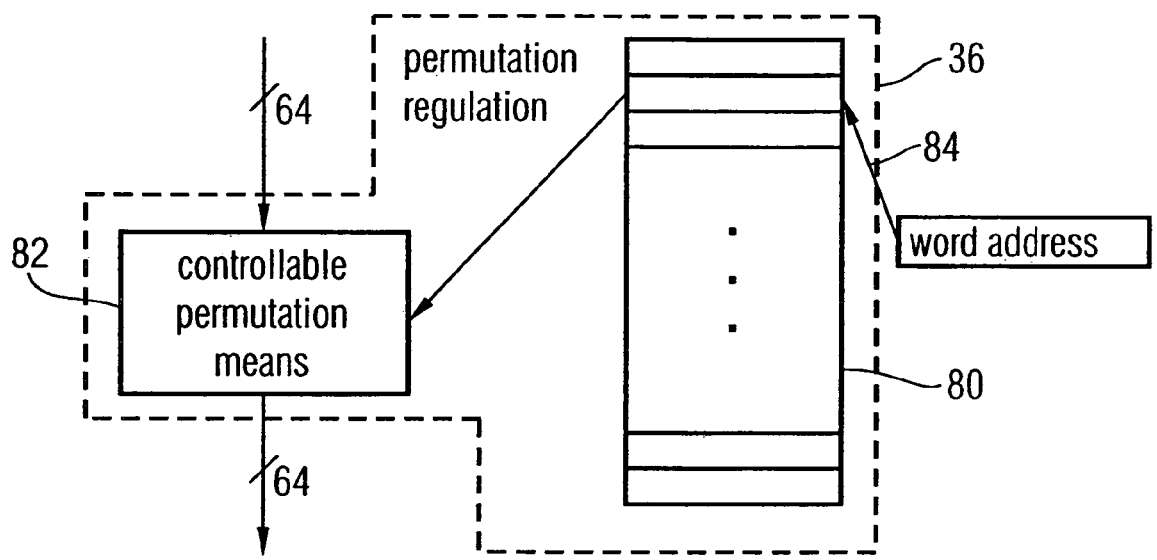
FIG. 6 is a schematical drawing for illustrating the structure and the mode of operation of the determination means of FIG. 2 according to a further embodiment of the present invention.
Figure 7:
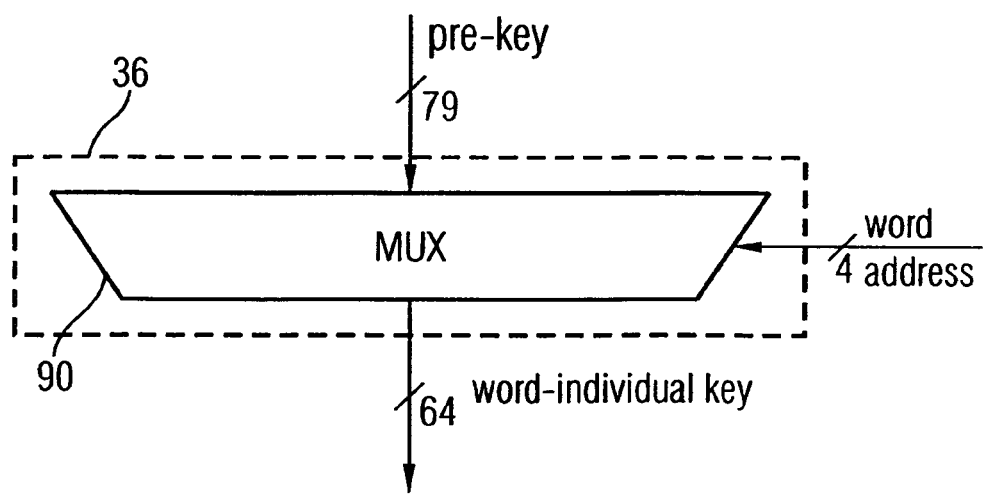
FIG. 7 is a schematical drawing for illustrating the structure and the mode of operation of the determination means of FIG. 2 according to a further embodiment of the present invention.

According to the embodiment of FIG. 6, the means 36 for determining the word-individual key comprises a look-up table 8 including predefined different permutation regulations, namely a different permutation regulation for every possible value, which the word address can assume, and a controllable permutation means 82. With the word address of the word address part of the unique address currently present on the address bus as an index, supplied to the means 36, a look-up means indicated by 84 accesses the look-up table 80, which then transmits the permutation regulation associated to this word address to the controllable permutation means 32. The permutation regulations stored in the look-up table 80 for every possible value of the word addresses, are, for example, 64-bit vectors with 6-bit coefficients, wherein the first coefficient indicates to which position according to the permutation regulation the least significant bit is shifted at the 64-bit data input of the controllable permutation means 82, the second coefficient indicates to where the next high-order bit at the 64-bit data input of the controllable permutation means 82 is to be shifted, etc. The data input of the controllable permutation means 82 receives the page pre-key. The word-individual 64-bit key is output at the 64-bit data output of the controllable permutation means 82, which differs from the page pre-key according to the indexed permutation regulation merely in that the individual bits within the 64-bit positions are shifted or swapped, respectively.

If the page pre-key is given, for example, by the vector $\overline{K}_{page}$, defined with reference to FIG. 4, the permutation means 72 outputs $(k_{P(0)}, k_{P(1)}, \ldots, k_{P(63)})$ at its data output as word-individual key $\overline{K}_{word}$, when the selected permutation vector is $(P(0), P(1), \ldots, P(63))$.

In other words, according to the embodiment of FIG. 6, a certain permutation is provided for every word address. For generating the word-individual key from the page pre-key, the permutation associated to the word address is operating on the bits of this page pre-key, wherein the result is the word-individual key.

With regard to the embodiments described above with regard to FIGS. 4-6 for the means 36 for determining the word-individual key, it applies that the same can easily be combined with the embodiment of FIG. 3 for the pre-key calculation means 34, since the same require or demand a 64-bit page pre-key as page pre-key. As has already been mentioned, it is further possible to design the pre-key calculation means 34 in a different way. It could be possible that the pre-key calculation means 34 generates a 79-bit page pre-key. This assumes the embodiment of FIG. 7 for the means for determining the individual key. According to this embodiment, the means 36 consists of a multiplexer 90 with a 79-bit data input, a 4-bit control input and a 64-bit data output, wherein the multiplexer 90 is formed to output the 79 bits of the page pre-key at the data input as 64-bit word-individual key to the 64-bit data output, in dependence of the 4-bit word address at the 4-bit control input 64. In other words, according to the embodiment of FIG. 7, a slightly longer page pre-key is generated than actually required for data encryption. Depending on the word address, a certain segment from this long page key is selected and used as word-individual key.

The multiplexer 90 can, for example, be formed such that it maps the page pre-key $\overline{K}_{page}=(k_0, k_1, k_2, \ldots, k_{77}, k_{78})$ in dependence on the word address W to the word-individual 64-bit key $\overline{K}_{word}=(k_0, k_1, \ldots, k_{63})$, when W=$0000_b$, to $\overline{K}_{word}=(k_1, k_2, \ldots, k_{64})$ when W=$0001_b$, to $\overline{K}_{word}=(k_2, k_3, \ldots, k_{65})$ when W=$0010_b$ . . . and to $\overline{K}_{word}=(k_{15}, k_{16}, \ldots, k_{78})$ when w 1111b.

Of course, different embodiments than the ones shown in FIGS. 4-7 are possible for the means 36 for determining the word-individual key. The means 36 could, for example, be implemented as cryptographical one-way function. A one-way function is a function where it is significantly more expensive to determine the inverse function or where it is impossible to determine the same. One example for a one-way function is, for example, a modular operation, such as a modular exponentiation. This one-way function operates then on the respective word address. The resulting function value linked to the page pre-key results in the word-individual key.

Since the above embodiments of FIGS. 3-7 dealt mainly with embodiments for the pre-key calculation means 34 and the determination means 36, with reference to FIG. 8, an embodiment for that part of the encryption/decryption means 16 will be described, which is responsible for the decryption of the encrypted words sent from the memory 12 (or from a cache in the case of hit) to the CPU, based on the word-individual key, as transmitted from the key generation means 18.

Figure 8:
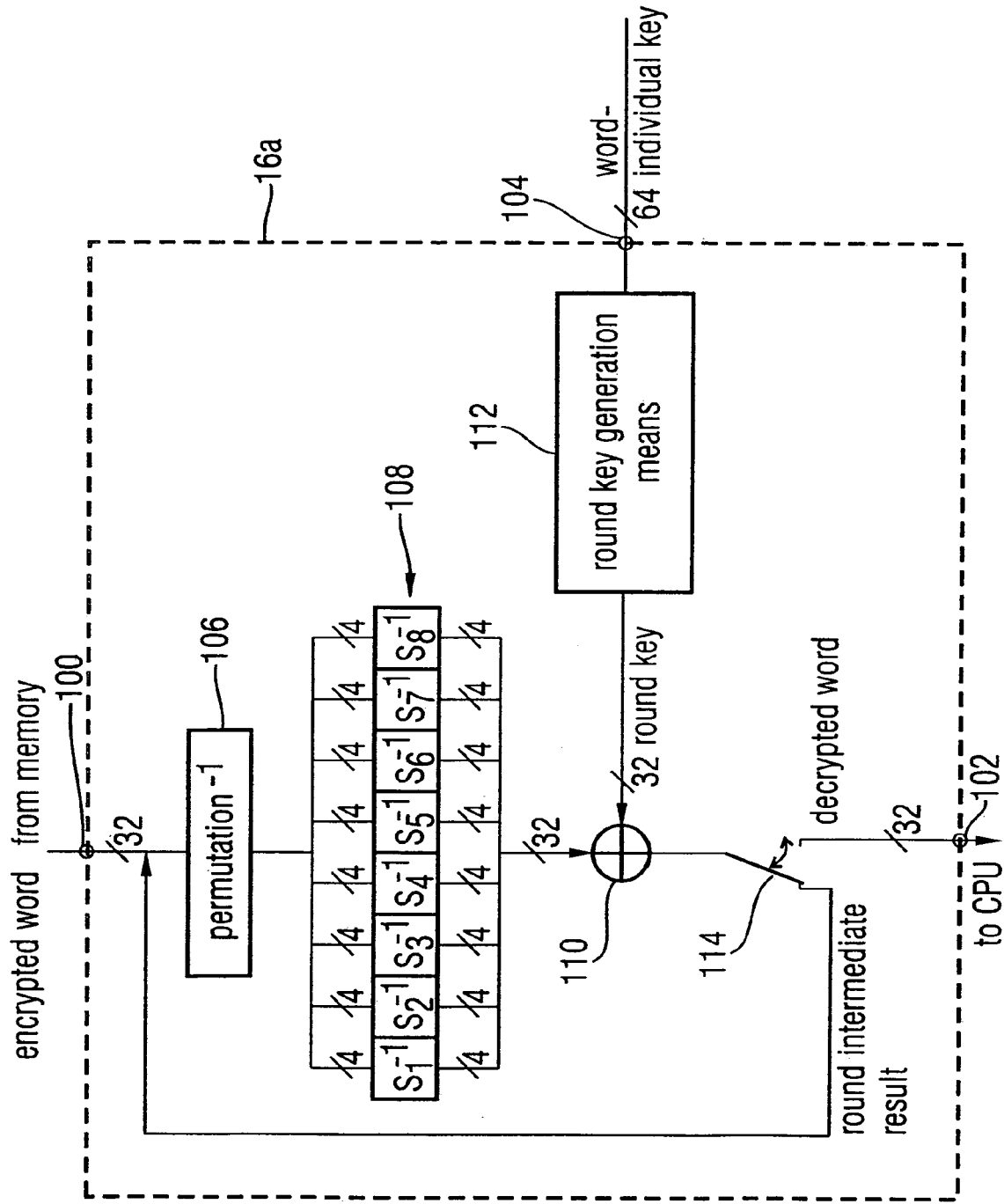
FIG. 8 is a block diagram of part of an encryption/decryption means as in FIG. 1 responsible for the decryption according to an embodiment of the present invention.

The decryption part of FIG. 8 is generally indicated by 16a. It comprises a data input 100 for receiving the encrypted word to be decrypted from the memory 12, as well as a data output 102 for outputting the decrypted word for transmission to the CPU 10. Further, the decryption part 16a comprises a key input 104 for receiving the word-individual key from the key generation means 18 (FIG. 1). As internal components, the receiver part 16a comprises a permutation means 106 for performing an inverse permutation, eight 4×4 S boxes $S_1^{-1}$-$S_8^{-1}$ connected in parallel, and each mapping four different bits of a 64-bit value according to a nonlinear mapping to four different bits of an output value 108, a 32-bit XOR operation means 110, a round key generation means 112 and a switch 114. A 32-bit data input of the permutation means 109 is connected to the data input 100 to obtain the encrypted 32-bit word. The permutation means 106 permutes the bits of the 32-bit word at the permutation input and outputs the permuted 32-bit word at its permutation output, wherein the permutation is inverse to a predetermined permutation P, which is indicated by $P^{-1}$. The same outputs the result of the permutation as 32-bit value to the S boxes 108 connected in parallel. Every S box $S_1^{-1}$-$S_8^{-1}$ comprises a 4-bit data input and a 4-bit data output. Different four bits of the 32-bit value are applied to every 4-bit data input of the S boxes 108, which has been output by the permutation means 106. As has already been mentioned, the S boxes 108 map the 4-bit values at the data inputs to 4-bit values at the data outputs by a nonlinear mapping, which can be different for every S boxes and preferably this is the case. The 4-bit values at the data outputs are again combined into a 32-bit word and supplied to a data input of the XOR operation means 110. The XOR operation means 110 comprises a further data input. The same is connected to an output of the round key generation means 112, whose input is again connected to the key input 104. The word-individual 64-bit key is applied to the key input 104, that has been obtained, for example, by one of the apparatuses of FIGS. 4-7, or by another possible embodiment of the key generation means 18. The round key generation means 112 generates a 32-bit round key based on the word-individual key and outputs the same to the second data input of the XOR operation means 110. The XOR operation means 110 links the 32-bit round key and the 32-bit output value from the S boxes 108 bit by bit, to obtain a 32-bit round intermediate result at the data output of the same. A switch input of the switch 104 is connected to the data output of the XOR operation means 110. The switch 114 comprises two switch outputs, namely a 32-bit round continuation switch output and a 32-bit round termination switch output. The switch 114 connects the data input to the round continuation switch output, so that the encrypted word in the data input 100 has passed through the means 106 to 110 a predetermined amount of times. The number is high enough to ensure a sufficient security of the encryption. The round continuation switch output is connected to the permutation input of the permutation means 106, while the round termination switch output is connected to the data output 102, to output the encrypted 32-bit word at the data output 102, which is connected to the CPU 10, via the data bus 22 (FIG. 1), after the predetermined number of rounds which the encrypted word has passed through at the data input 100. The round key generation means 102 is formed such that it generates a different round key from the word-individual 64-bit key at the data input 104 for every round which the encrypted word passes through the means 106 to 110.

Since the structure of the decryption part 16a has been described above, its mode of operation will be briefly described below. The encrypted 32-bit word read out from the memory 12 reaches the permutation means 106 across the data input 100. The same permutes the encrypted word with regard to the arrangement or bit position distribution, respectively, of its bits according to a permutation regulation $P^{-1}$. Then, the S boxes 108 connected in parallel provide for a nonlinear mapping of the permuted 32-bit value to a permuted mapped 32-bit value. The same is XORed bit by bit in the XOR operation means 110 with a first round key, which the round key generation means 112 has generated from the word-individual key for the first round, whereby the round intermediate result with 32 bits is obtained. If more than one round is to be performed, the switch 114 passes this 32-bit word again to an input of the permutation means 106, whereby the permutation, the nonlinear mapping as well as the XOR operation are repeated, the latter, however, with a newly determined round key. After the last round, the switch 114 switches to the round termination switch output and outputs the round intermediate result as decrypted 32-bit word.

Figure 9:
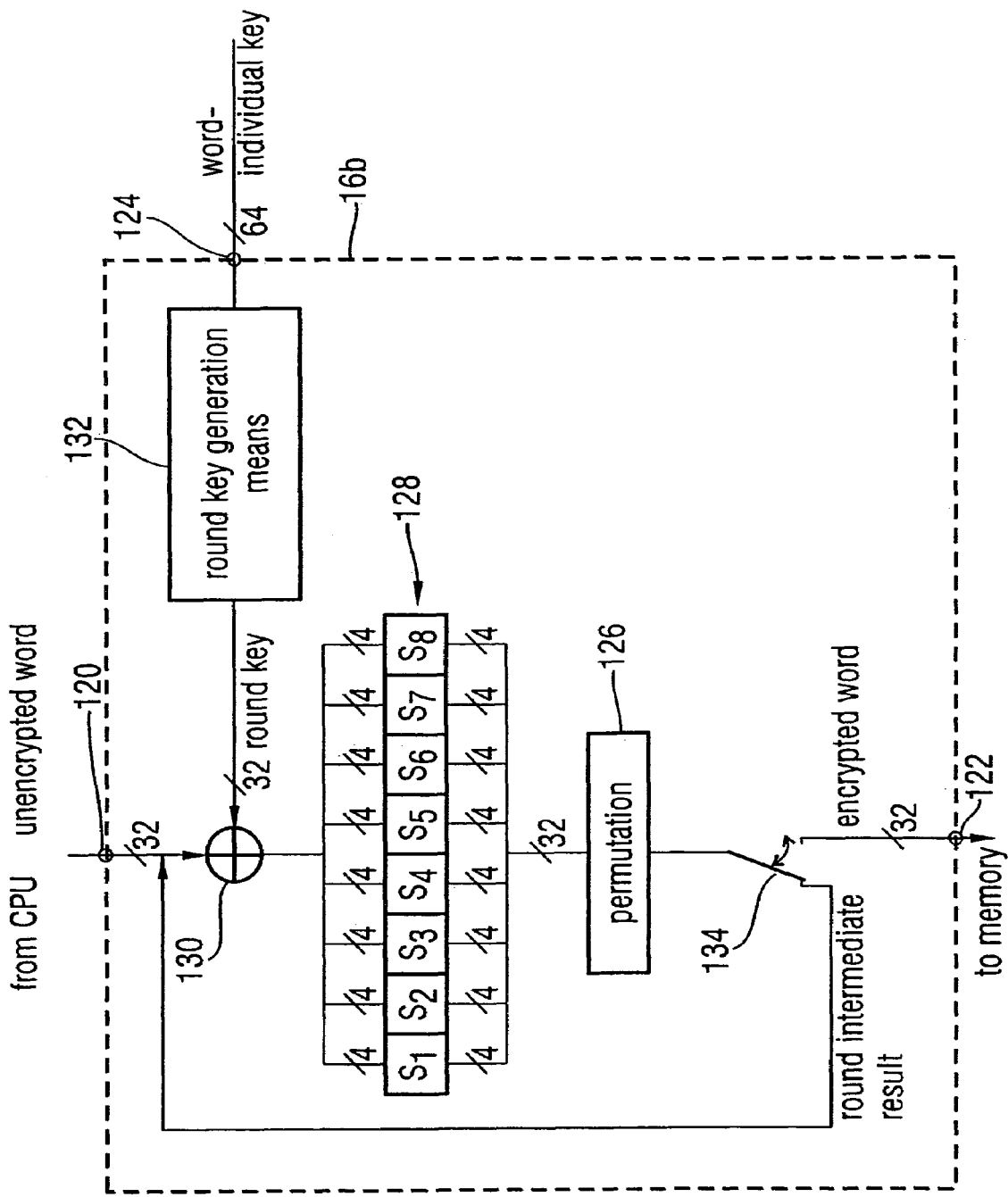
FIG. 9 is a block diagram of part of a encryption/decryption means as in FIG. 1 responsible for the encryption according to an embodiment of the present invention.

The decryption part of the encryption/decryption means 16 described with regard to FIG. 8 will always become active when the CPU loads encrypted memory contents from memory 12. FIG. 9 shows an embodiment for an encryption part 16b of the encryption/decryption means 16, which can encrypt unencrypted words from the CPU 10 at the memory 12 during a storage process into unencrypted words, such that the same, when they are decrypted again by the encryption/decryption means 16 via the decryption part 16a of FIG. 8 in a load process, reach the CPU 10 in their original state across the data bus 22.

The encryption part 16b comprises a data input 120 for receiving an unencrypted word to be encrypted from the CPU 10 as well as a data output 122 for outputting an encrypted word for transmission to the memory 12. Further, the encryption part 16b comprises a key input 124 for receiving the word-individual key. Above that, the encryption part 16b comprises a permutation means 106 for permuting a 32-bit value at a permutation input according to permutation P, which is inverse to the permutation performed by the permutation means 106, to a permutation result at a permutation output, eight 4×4 S boxes $S_1$-$S_8$ 128 connected in parallel, an XOR operation means 130, a round generation means 132 and a switch 134.

The XOR operation means 130 comprises two 32-bit data inputs, one of which is connected to the data input 120 and the other to a data output of the round key generation means 132. A 32-bit data output of the XOR operation means 130 is connected to the S boxes $S_1$-$S_8$ such that four different bits of the 32-bit data output of the XOR operation means 130 are applied to the 4-bit data inputs of the same. The S boxes $S_1$-$S_8$ map 4-bit values at their data inputs according to nonlinear mappings to four bit values at their data outputs, wherein the linear mappings are inverse to those associated to the S boxes of FIG. 1 at 108, i.e. $S_i(S_i^{-1}(x))=S_i(S_i^{-1}(x))=x$ for all i=1 ... 8 and for all 4-bit values x.

The 4-bit values at the data outputs of the S boxes 128 are transmitted as 32-bit value to the permutation input of the permutation means 126. The permutation output of the permutation means 126 is connected to a switch input of the switch 134. A round continuation switch output of the switch 134 is connected to the first data input of the XOR operation means 130, while a round termination switch output of the switch 134 is connected to the data output 122. An input of the round key generation means 132 is connected to the key input 124.

Since the structure of the encryption part 16b has been described above, its mode of operation will be described below. The encryption part 16b is substantially structured inversely to the decryption part 16a. When an unencrypted word reaches the XOR operation means 130 at the data input 120, the XOR operation means 130 links this unencrypted word to the round key, which the round key generation means 132 generates from the word-individual key. This round key is that round key which the decryption part 16a will use in its last round to decrypt the encrypted word again. The safe XORed 32-bit value is mapped to a mapped 32-bit value by the S boxes 128. This operation will be reversed exactly by the S box mapping of the last round during decryption in the decryption part 16a. The mapped 32-bit value is permuted by the permutation means 126 according to the permutation regulation P to obtain the permuted 32-bit value representing the round intermediate result. This permutation of the first round during the encryption will be reversed during the decryption in the first round by the permutation $P^{-1}$ in the decryption part 16a. As long as further rounds are desired, the switch 134 connects the switch input to the round continuation switch output, otherwise to the round termination switch output to output the 32-bit round intermediate result as the encrypted word to the memory 12 across the data output 122. The round keys, which the round key generation means 132 generates from the word-individual key, are different for the respective rounds and are exactly inversely associated to the rounds compared to the round keys which the round key generation means 112 generates for the decryption rounds. In that way, it is ensured that an encrypted word as generated by the encryption part 16b is decrypted again by the decryption part 16a to a decrypted word with the original value. The word-individual key applied to the key input signal 104 or 124, respectively, is the same during decryption and encryption, since both during load and store access the same unique address for the respective word is output at the address bus 20 (FIG. 1), so that the key generation means 18 generates the same word-individual key both during loading and during storing.

With regard to FIGS. 8 and 9, it should be noted that there are many other possibilities of realizing the encryption/decryption in the encryption/description means 16. Among others, parts of the components in the decryption means 16a can also be used in the encryption means 16b, when corresponding switches provide for an appropriate connection of these components depending on the encryption or decryption. Further, encryption and decryption could also consist of double rounds, having a sub round with an S box mapping and a sub round with an inverse $S^{-1}$ box mapping, so that all components of the encryption/decryption apparatus can be used both during decryption and encryption.

The above embodiments assumed that a 64-bit key is supplied as word-individual key to the encryption/decryption means, which then generates thereupon round keys according to the embodiments of FIGS. 8 and 9, which are used for the individual encryption or decryption rounds, respectively. The embodiment described below with reference to FIG. 10 differs from these embodiments in that a round sequence is supplied to the encryption/decryption means as word-individual key, which consists of round keys which are the same for the words of one page but are arranged in a different order.

Figure 10:
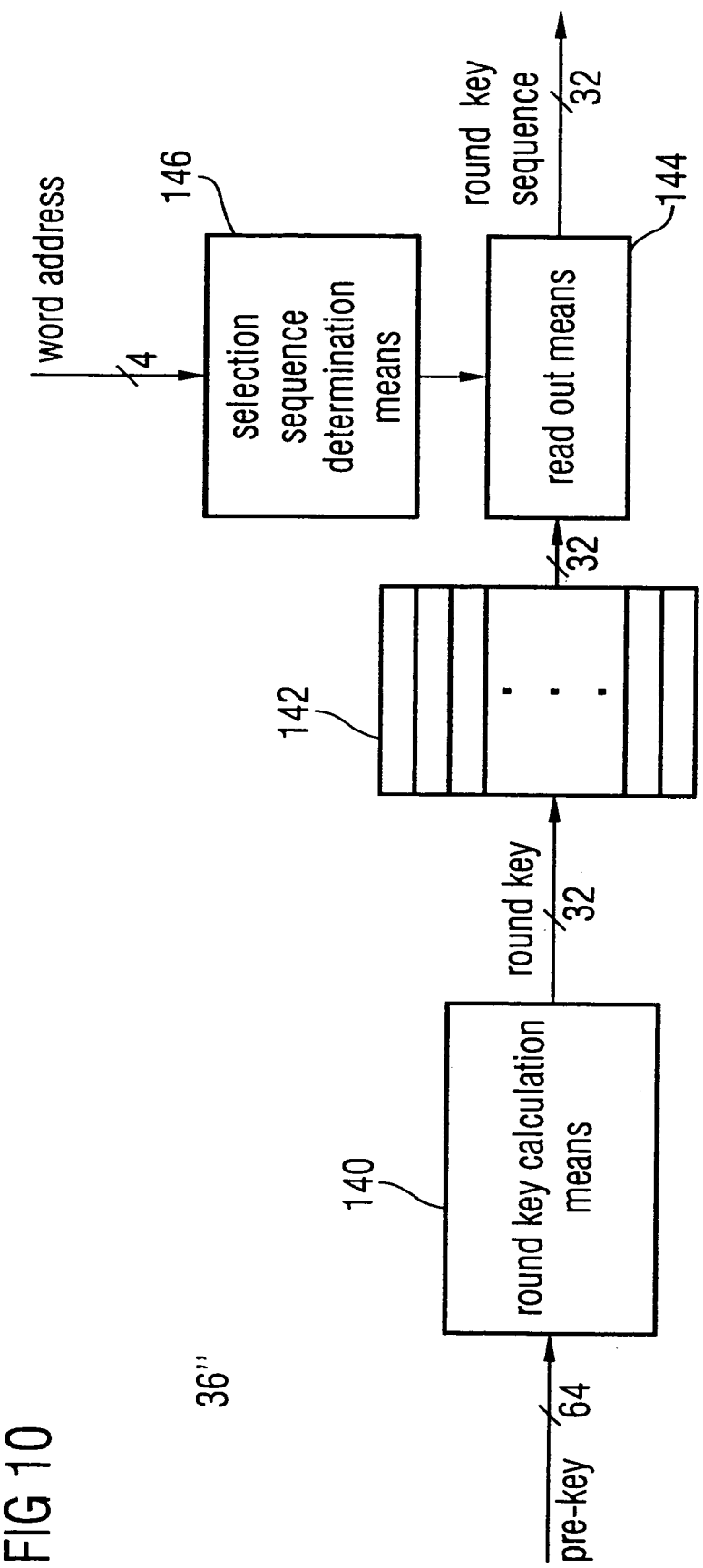
FIG. 10 is a block diagram of a means for calculating a round key sequence as the individual key from the pre-key according to a further embodiment of the present invention.

FIG. 10 shows an embodiment for a means 36" generating such a word-individual key. The means 36" comprises a round key calculation means 140, a look-up table 142, a readout means 144 and a selection sequence determination means 146. The round key calculation means 140 comprises a data input and a data output, wherein the 64-bit page pre-key is applied to the data input, as will be supplied either by the pre-key calculation means 34 or the latch 38 (see FIG. 2a). The round key calculation means 140 calculates several different round keys based on the page pre-key. The number of round keys depends on the number of rounds of the iterative block cipher, which is implemented by the encryption/decryption means 16, such as by the decryption and encryption part of FIGS. 8 and 9. Thus, for every round, the round key calculation means 140 enters a different round key into the look-up table 142. The selection sequence determination means 146 receives the 4-bit word address of the currently present address 30 on the address bus 20 at the data input. Depending on the word address, the selection sequence determination means 146 selects a predetermined different sequence with regard to the round keys, in which same are to be read out. The same indicates this sequence to the readout means 134, which then reads out the 32-bit long round key according to the indicated sequence, to output the same to the encryption/decryption means 16 in the indicated sequence as round key sequence of 32-bit round keys. Thus, different words with different word addresses in the same page lead consequently to a different cipher text, even with the same word content, since the round key sequence is not the same in the individual rounds in the encryption/decryption means 16 at the iterative block cipher.

In other words, according to the embodiment of FIG. 10, an iterative block cipher is assumed in the encryption/decryption means 16, wherein an individual round key is applied in every round. These round keys are provided in registers of the look-up table 142, after they have been calculated in advance by the page pre-key. The 4-bit word address determines now the sequence in which the round keys are applied in the iterative block cipher.

Thus, the above-described embodiments for generating keys for the encryption of data to be stored and/or decryption of stored read data when accessing a memory provide an address-dependent area key generation. Instead of performing the area key generation for every word in the same complicated way, the process of the area key generation is divided into two sub processes, namely a relatively expensive and slow step and a simple and fast step, which is practically for free. Only the simplest step has to be performed for every single word, the expensive step, however, only once for several words simultaneously.

Here, holding on to the address-dependent area key generation is more than only useful: Nowadays, the word size in a microprocessor is only several bytes, for example 4 byte or 32 bit, respectively. However, a cryptographic 32-bit block cipher does not make any sense. The number 32 is small enough that an unauthorized person can collect the associated cipher text for all possible $2^{32} \approx 4.3$ billion plain texts and list them in a type of coding dictionary. Cryptographical block ciphers only make sense for a block width of 64 bit, better for 128 bit. This problem cannot be solved by applying a CBC mode, as described in the introduction of the description, to a "32-bit block cipher". However, the address-dependent area key generation solves this problem in a satisfactory way. Now, no coding dictionary of the above type can be obtained. Because the same 32-bit plain text word appearing at two different memory addresses is encrypted with different area keys.

Thereby, the associated cipher texts will also be different, even when the underlying plain text is the same.

The area key generation for accessing a memory with encrypted content according to the above embodiment was to generate a pre-key valid for the whole page from the secret master key and the page address. This is the expensive step that has be performed only once per page. Then, a word-individual key is derived from the pre-key and the word address in a simple way. The encryption of the word is now performed with the word-individual key.

The resulting advantages are the following: The calculation of the page key has to fulfill certain cryptographic criteria is correspondingly expensive. The page key is either calculated in an individual hardware unit or the encryption unit 16 is also used for calculating the page key. Since the calculation of the page key is required less frequently (only once per page), the hardware unit for the page key generation can be made smaller. In the other case, where the encryption hardware is also used for page key generation, the encryption rate increases due to the less frequent usage of the encryption hardware.

With reference to the above embodiments, it should be noted that, for example, the XOR gates can easily be replaced by NXOR gates. The above-described previous storage of a page pre-key with displacement strategy can also be replaced by a storage in a sufficiently large volatile memory without displacement strategy, so that the page pre-keys are automatically deleted when the power supply is missing. Further, prior to generating the page pre-key, the page address could also be subjected to other operations than the expansion in FIG. 3. Further, the present invention does not have to operate based on the smallest addressable units of the directly addressable memory, but larger addressable units can also be chosen. Further, mapping of the page address to the page pre-key could be any mapping, preferably, however, a nonlinear mapping.

Particularly, it should be noted that depending on the circumstances, the inventive scheme can also be implemented in software. The implementation can be made on a digital storage media, particularly a disc or CD with electronically readable control signals, which can cooperate with a programmable computer system such that the respective method is performed. Generally, thus, the invention consists also in a computer program product with a program code for performing the inventive method stored on a machine-readable carrier, when the computer program product runs on a computer. In other words, the invention can be realized as a computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page, comprising:

a calculator configured to calculate a page pre-key based on the page address;

a determiner configured to determine the individual key based on the page pre-key and the unit address;

a memory configured to store the calculated page pre-key; and a checker configured to check whether during a next access to a further predetermined unit to which a further unique address is associated, an already calculated page pre-key exists in a temporary memory, which has been calculated based on a page address of a unique address, which is identical to the page address of the further unique address, and, if this is the case, transmitting the already calculated page pre-key to the determiner by bypassing the calculator, and, if this is not the case, transmitting the page address of the further unique address to the calculator, with at least one of, the calculator comprising more chip area than the determiner, and the calculator using a longer processing run time than the determiner.

2. The apparatus according to claim 1, wherein the calculator comprises a cipherer configured to cipher the page address or a data block derived from the page address with a master key to obtain the page pre-key.

3. The apparatus according to claim 2, wherein the cipherer comprises an expander fconfigured to expand the page address to obtain an expanded data block by mapping every bit of the page address to at least one different bit of the expanded data block, and mapping at least one bit of the page address to at least two bits of the expanded data block, and wherein the cipherer is adapted to cipher the expanded data block.

4. The apparatus according to claim 1, wherein the determiner comprises an XOR gate configured to XOR bits of the unit address bit by bit with predetermined bits of the page pre-key to obtain the individual key.

5. The apparatus according to claim 1, wherein the determiner further comprises:

a look-up table with masking vectors, each of the masking vectors being associated with a possible unit address;

a look-up unit configured to look up in the look-up table with the unit address as index to obtain the associated masking vector; and an XOR gate configured to XOR the masking vector and the page pre-key bit by bit to obtain the individual key.

6. The apparatus according to claim 1, wherein the determiner comprises a controllable permuter configured to permute bits of the page address according to a permutation regulation depending on the unit address to obtain the individual key.

7. The apparatus according to claim 1, wherein the determiner comprises a selector configured to select bits of the page address according to a selection regulation depending on the unit address to obtain the individual key.

8. The apparatus according to claim 1, wherein the determiner comprises:
- a driver configured to derive several round keys from the page pre-key; and
- a definer configured to define an order among the round keys to obtain a sequence of round keys, wherein the order depends on the unit address and the sequence represents the individual key.

9. A system comprising:
- an apparatus configured to generate an individual key for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page, comprising:
  - a calculator configured to calculate a page pre-key based on the page address;
  - a determiner configured to determine the individual key based on the page pre-key and the unit address;
  - a memory configured to store the calculated page pre-key; and
  - a checker configured to check whether during a next access to a further predetermined unit to which a further unique address is associated, an already calculated page pre-key exists in a temporary memory, which has been calculated based on a page address of a unique address, which is identical to the page address of the further unique address, and, if this is the case, transmitting the already calculated page pre-key to the determiner by bypassing the calculator, and, if this is not the case, transmitting the page address of the further unique address to the calculator; and
- an apparatus configured to decrypt an encrypted memory content in the predetermined addressable unit based on the individual key,
- with at least one of, the calculator comprising more chip area than the determiner, and the calculator using a longer processing run time than the determiner.

10. A system comprising:
- an apparatus configured to generate an individual key for accessing a predetermined addressable unit of a memory divided into addressable units, wherein the addressable units are combined into pages in groups, wherein a unique address is associated to the predetermined addressable unit, which is made up of a page address indicating the page to which the addressable unit belongs, and a unit address identifying the addressable unit among the other addressable units belonging to the page, comprising:
  - a calculator configured to calculate a page pre-key based on the page address;
  - a determiner configured to determine the individual key based on the page pre-key and the unit address;
  - a memory configured to store the calculated page pre-key; and
  - a checker configured to check whether during a next access to a further predetermined unit to which a further unique address is associated, an already calculated page pre-key exists in a temporary memory, which has been calculated based on a page address of a unique address, which is identical to the page address of the further unique address, and, if this is the case, transmitting the already calculated page pre-key to the determiner by bypassing the calculator, and, if this is not the case, transmitting the page address of the further unique address to calculator; and
- an apparatus configured to encrypt data to be stored based on the individual key and writing the encrypted data to be written into the predetermined addressable unit,
- with at least one of, the calculator comprising more chip area than the determiner, and the calculator using a longer processing run time than the determiner.

11. A method for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page, comprising:
- calculating a page pre-key based on the page address in a calculator;
- determining the individual key based on the page pre-key and the unit address in a determiner;
- temporarily storing the calculated page pre-key in a memory for temporary storage; and
- checking whether during a next access to a further predetermined unit, to which a further unique address is associated, an already calculated page pre-key exists in a temporary memory, which has been calculated based on a page address of a unique address, which is identical to the page address of the further unique address;
- if an already calculated page pre-key exists, transmitting the already calculated page pre-key to the determiner by bypassing the calculator; and
- if no already calculated page pre-key exists, transmitting the page address of the further unique address to the calculator,
- with at least one of, the calculator comprising more chip area than the determiner, and the calculator using a longer processing run time than the determiner.

12. A computer readable medium having stored thereon a computer program with a program code for performing a method for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page, the method comprising:
- calculating a page pre-key based on the page address in a calculator;
- determining the individual key based on the page pre-key and the unit address in a determiner;
- temporarily storing the calculated page pre-key in a memory for temporary storage; and
- checking whether during a next access to a further predetermined unit, to which a further unique address is associated, an already calculated page pre-key exists in a temporary memory, which has been calculated based on a page address of a unique address, which is identical to the page address of the further unique address;
- if an already calculated page pre-key exists, transmitting the already calculated page pre-key to the determiner by bypassing the calculator; and if no already calculated page pre-key exists, transmitting the page address of the further unique address to the calculator,
when the computer program runs on a computer,
with at least one of the calculator comprising more chip area than the determiner, and the calculator using a longer processing run time than the determiner.

13. An apparatus for generating an individual key for accessing a predetermined addressable unit of a memory divided into addressable units, wherein the addressable units are combined into pages in groups, wherein a unique address is associated with the predetermined addressable unit, which is made up of a page address indicating the page to which the addressable unit belongs, and a unit address identifying the addressable unit among the other addressable units belonging to the page, comprising:
  a calculating means for calculating a page pre-key based on the page address;
  a determining means for determining the individual key based on the page pre-key and the unit address; and
  a memory means for storing the calculated page pre-key; and
  a checking means for checking whether during a next access to a further predetermined unit to which a further unique address is associated, an already calculated page pre-key exists in a temporary memory, which has been calculated based on a page address of a unique address, which is identical to the page address of the further unique address, and, if this is the case, transmitting the already calculated page pre-key to the determining means by bypassing the calculating means, and, if this is not the case, transmitting the page address of the further unique address to the calculating means,
with at least one of the calculating means comprising more chip area than the determining means, and the calculating means using a longer processing run time than the determining means.

* * * * *

UNITED STATES PATENT AND TRADEMARK OFFICE
CERTIFICATE OF CORRECTION

PATENT NO.         : 7,451,288 B2
APPLICATION NO.    : 11/396211
DATED              : November 11, 2008
INVENTOR(S)        : Rainer Goettfert et al.

Page 1 of 1

It is certified that error appears in the above-identified patent and that said Letters Patent is hereby corrected as shown below:

Column 18:

Claim 3, line 2, delete "fconfigured" and insert -- configured -- therefor; and

Claim 8, line 3, delete "driver" and insert -- deriver -- therefor.

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,451,288 B2 | Page 1 of 1 |
| APPLICATION NO. | : 11/396211 | |
| DATED | : November 11, 2008 | |
| INVENTOR(S) | : Rainer Goettfert et al. | |

It is certified that error appears in the above-identified patent and that said Letters Patent is hereby corrected as shown below:

Column 18:

Claim 3, line 38, delete "fconfigured" and insert -- configured -- therefor; and Column 19:

Claim 8, line 3, delete "driver" and insert -- deriver -- therefor.

This certificate supersedes the Certificate of Correction issued February 24, 2009.

Signed and Sealed this

Fourteenth Day of April, 2009

JOHN DOLL
*Acting Director of the United States Patent and Trademark Office*